No. 836,823.

PATENTED NOV. 27, 1906.

F. McD. OLIVER & C. B. WESTCOTT.
DECOY DUCK.
APPLICATION FILED SEPT. 12, 1906.

WITNESSES:

INVENTORS
Francis McD. Oliver and
C Carter B. Westcott
By Franklin H. Hough
Attorney

UNITED STATES PATENT OFFICE.

FRANCIS McDONALD OLIVER AND CHARLES B. WESTCOTT, OF SAVANNAH, GEORGIA.

DECOY-DUCK.

No. 836,823.   Specification of Letters Patent.   Patented Nov. 27, 1906.

Application filed September 12, 1906. Serial No. 334,364.

*To all whom it may concern:*

Be it known that we, FRANCIS MCDONALD OLIVER and CHARLES B. WESTCOTT, citizens of the United States, residing at Savannah, in the county of Chatham and State of Georgia, have invented certain new and useful Improvements in Decoy-Ducks; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in decoy-ducks; and the object of the invention is to produce a simple and efficient device of this nature so constructed that it may be collapsed and reduced to a small compass for convenience in transportation or storage.

More specifically, the invention comprises a decoy-duck so constructed that when inflated it will have the appearance of a natural duck and in the provision of means whereby the head of the decoy may be held in different positions, the bottom of the decoy being flat, enabling the same to have a swimming-like motion back and forth across the current as the water flows past, thereby giving the decoy a perfect life-like appearance. By the provision of the flat bottom, made, preferably, of wood, which serves as a ballast, and by the provision of a sinker attached to the forward end of the decoy the latter is rendered slightly "bow heavy," thereby giving a backward and forward motion across the current and giving the further appearance of a swimming or feeding fowl. This movement when the device is attached to a string will allow the bill of the decoy to dip below the surface, thereby imitating the feeding of the fowl, all of which features serve to increase the efficiency of the device as a decoy for attracting the attention of wild ducks.

Our invention comprises various other details of construction and arrangements of parts, which will be hereinafter fully described and then specifically defined in the appended claims.

We illustrate our invention in the accompanying drawings, in which—

Figure 1:
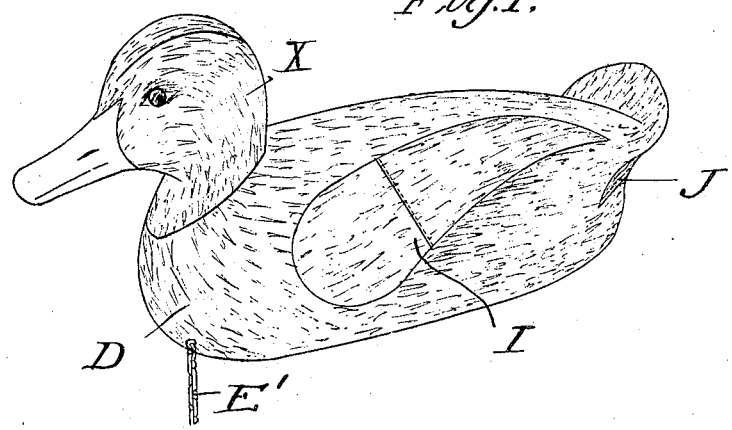
Figure 2:
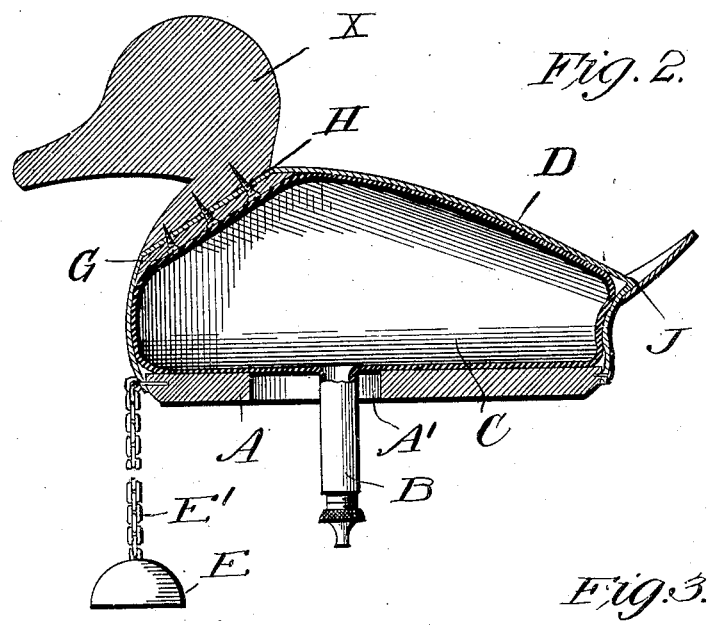
Figure 3:
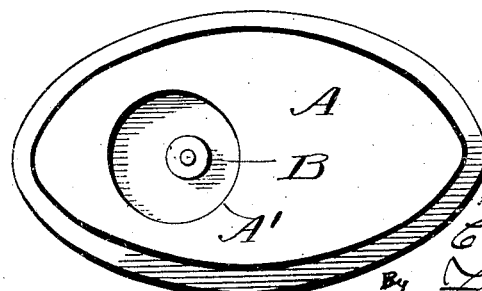

Figure 1 is a perspective view of our improved decoy-duck. Fig. 2 is a vertical sectional view through the same, and Fig. 3 is a bottom plan view.

Reference now being had to the details of the drawings by letter, A designates the bottom of a decoy which is made, preferably, of wood and is flat, adapted to ride upon the surface of the water, and of sufficient weight to keep the decoy right side up under normal conditions. A' is an opening in said bottom adapted to receive a tube B, having a valve therein, the outer end of which tube is closed by a cap, while its inner end is connected to a bag C, adapted to be inflated through said tube.

D designates the cover to the decoy, which may be made of any suitable material, preferably of a cloth fabric, and of such a shape as to resemble when inflated by the bag the natural form of a duck.

E designates a weighted sinker connected by a chain E' to the forward end of the bottom of the decoy, whereby the forward end may be held down as the decoy rides the current or ripple upon the surface of the water, thereby giving the decoy the natural appearance of ducking its head in the act of feeding.

The head F and neck of the duck, which are made, preferably, of a single piece of material, preferably wood, are fastened to the body portion by means of a clamping-plate G, which engages the under surface of the bag, and screws H are passed through said clamping-piece G and made to engage the neck of the duck, thereby securely clamping the neck to the bag. Said clamping-plate, it will be noted, may be held in different positions, whereby the decoy may have its head set at an inclination, if desired, to further resemble a live duck turning its head to one side.

The body portion of the duck, which may be made in any suitable manner, has, preferably, wing-tips I, which are fastened at their inner ends to the body of the duck, and their rear ends are loose, as also is the tail J, whereby a breeze may cause the same to flutter, giving the appearance of the movement of the feathers of the natural duck.

From the foregoing it will be noted that by the provision of a decoy-duck made in accordance with our invention a simple and efficient device is afforded having a near approach to the natural duck, and so constructed, being ballasted by the wooden bottom which rides upon the surface of the water in such a manner that it will have the appearance of a natural duck swimming. By the weight attached to the forward end of the bottom the bill of the duck as the latter rides the ripples or is actuated by the current will be caused to dip below the surface, giving the appearance of the fowl feeding. By the shape of the decoy being held distended by the inflated bag and the head and neck being made of wood the latter may be held erect at all times, and by the provision of the body made as contemplated in our invention the expansion and contraction of the air within the bag incident to changes of the temperature will not affect the same.

What we claim is—

1. A decoy-duck provided with a body portion and a wooden bottom which is apertured, an inflating-bag mounted within said body portion and having a tube extending through an opening in said bottom, a head and neck made integral, a clamping-plate mounted within the body portion, and fastening means passing through said clamping-plate and the body portion and designed to engage the neck, as set forth.

2. A decoy-duck comprising a body portion having artificial wings and tail fastened thereto, with their tips free, a flat bottom to said body portion, an inflating-bag mounted within the body portion and having a filling-tube extending through an opening in said bottom, and a head fixed to said body portion, as set forth.

In testimony whereof we hereunto affix our signatures in the presence of two witnesses.

FRANCIS McDONALD OLIVER.
CHARLES B. WESTCOTT.

Witnesses:
DANIEL G. HEIDT, Jr.,
SIMON N. GAZAN.